United States Patent [19]

Gold

[11] Patent Number: 5,467,522
[45] Date of Patent: Nov. 21, 1995

[54] WINDSHIELD WIPER DEICING WINDSHIELD AND METHOD OF CONSTRUCTING SAME

[76] Inventor: Peter Gold, 389 Peninsula Blvd., Hempstead, N.Y. 11550

[21] Appl. No.: 295,410

[22] Filed: Aug. 25, 1994

[51] Int. Cl.⁶ ..................................................... H05B 3/00
[52] U.S. Cl. .............................. 29/611; 29/620; 219/203; 219/522
[58] Field of Search ...................... 29/611, 620; 219/203, 219/213, 522

[56] References Cited

U.S. PATENT DOCUMENTS

| | | | |
|---|---|---|---|
| 2,429,420 | 10/1947 | McMaster | 219/203 |
| 3,529,074 | 9/1970 | Lewis . | |
| 4,373,130 | 2/1983 | Krasborn et al. | 219/522 |
| 5,173,586 | 12/1992 | Gold | 338/306 |

*Primary Examiner*—P. W. Echols

[57] ABSTRACT

Safety glass, known to consist of glass panels having an interposed plastic ply to minimize shattering, is converted by the within method into an auto windshield having a wiper deicing function by the application of resistive conductive coatings forming a circuit along the glass panel bottom edges insulated by the plastic ply, which circuit is heat-generating when connected to the auto battery and thus effective to deice the wiper which in an at-rest position is near enough to the heat source to benefit therefrom for the purposes intended.

1 Claim, 2 Drawing Sheets

WINDSHIELD WIPER DEICING WINDSHIELD AND METHOD OF CONSTRUCTING SAME

The present invention relates to improvements in deicing an auto front windshield wiper, the improvements more particularly being embodied in a safety glass-type windshield, i.e. a windshield constructed of glass laminates on opposite sides of a plastic ply which minimizes the shattering thereof, during the construction of said type windshield such that in addition to the safety function thereof there is a wiper deicing function.

EXAMPLES OF THE PRIOR ART

It is already known for aircraft windshields to use laminated safety glass and, using electrical current, to defog and deice the windshield using the heat generated by the electrical current. The busbar of such electrical deicing circuits is an external component in U.S. Pat. No. 3,529,074 issued to Lewis on Sep. 15, 1970 (see FIG. 1), and in U.S. Pat. No. 2,429,420 issued to McMaster on Oct. 21, 1947 are attached metal electrical contacts.

The aforesaid and all known laminated glass windshields are not embodied with an electrical current-generating capacity during their construction of laminates, nor are they particularly rendered suitable for deicing wipers operably disposed thereon.

Broadly, it is an object of the present invention to provide a windshield constructed for efficient wiper deicing to overcome the foregoing and other shortcomings of the prior art.

More particularly, it is an object to use to advantage the non-electrically conductive plastic ply of the laminate safety glass construction in the functioning of an electrical circuit to generate heat incident to deicing the wiper, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Underlying the present invention is the recognition that the current practice or method of constructing a "safety glass" windshield is advantageous for also embodying the resulting windshield with a heat-generating electrical circuit, the latter in turn being advantageously used to deice the wiper of the windshield. To this end, the wiper in its at-rest position is adjacent the lower edge of the windshield on the driver's side, and thus is at the site where, as will be explained in greater detail herein, the generated heat is effective for the deicing function intended.

Figure 1:
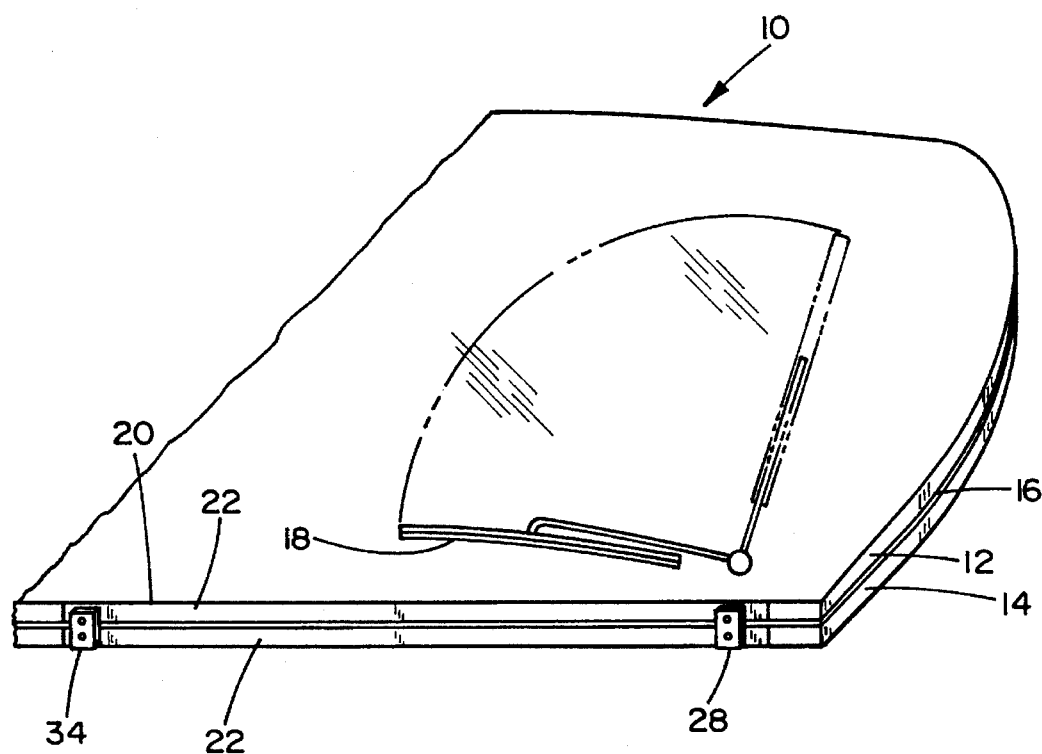
FIG. 1 is a perspective view of a windshield constructed in accordance with the present invention, further depicting the at-rest position of a windshield wiper utilized in connection therewith in full line and phantom perspective.
Figure 2:
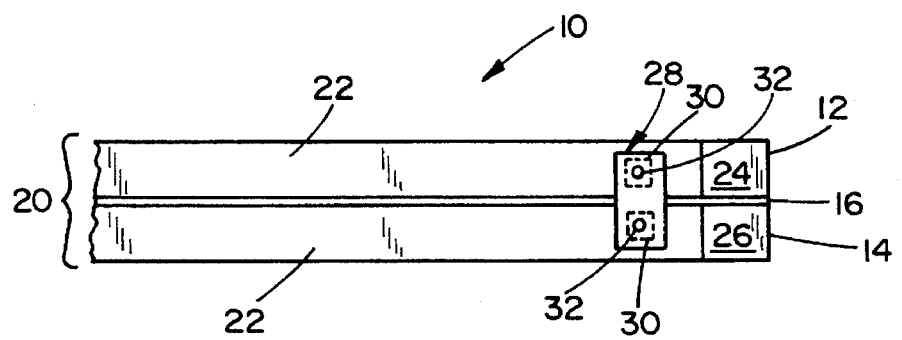
FIG. 2 is an enlarged side elevation view of a portion of the windshield of FIG. 1.

As shown in FIGS. 1 and 2, a vehicle windshield 10 constructed in accordance with the present invention comprises a pair of glass panels 12, 14 bonded together by use of an intermediate plastic layer or ply 16, as known in the art and documented in U.S. Pat. No. 3,616,122 issued to Orcutt on Oct. 26, 1971. When in place upon a vehicle a driver's side windshield wiper blade 18 is utilized for clearing the exterior surface of the windshield, said wiper typically having an at-rest position as shown in FIG. 1 which is adjacent the lower marginal edge 20 of the windshield.

Each of the glass panels 12, 14 is provided with a conductive, resistive coating 22 upon their respective sidewall-forming edges 24, 26 (FIG. 2) which together form the lower or bottom edge 20 of the windshield. An appropriate layer of silver oxide, or other conductive layer-forming coating may be utilized. The specific choice of coating, as well as its applied thickness, is chosen, in a manner known to those skilled in the art, so as to produce a coating having appropriate resistive properties to generate heat along its length when an electrical potential is applied to the coatings.

In particular, the electrical potential is applied to the coatings by the affixation of a terminal block 28 mounted to the windshield edge 20 in a manner whereby electrical connection is afforded to each of the coatings on the glass sidewall edges 24, 26. The terminal block includes a pair of electrical contact pads 30 exposed at the lower face of the block, along with a pair of terminal means 32, such as screw connectors as known in the art, located upon the top surface of the block and in electrical contact with the respective contact pad. Preferably the connector block is applied at a first end of the resistive coatings, which themselves are preferably of equal length and disposed in a side-by-side relationship on the glass panel sidewall edges. A bridging contact or jumper 34 is connected between the coatings at the end distal to the terminal block, resulting in a continuous resistive loop formed by the coatings and distal bridge between the terminal means 32. The intermediate plastic layer 16 separates the glass panels and thus the affixed coatings 22 from each other, allowing the coatings to be electrically joined together only by jumper 34, and thus permitting the conductive loop to be developed therethrough.

Figure 3:
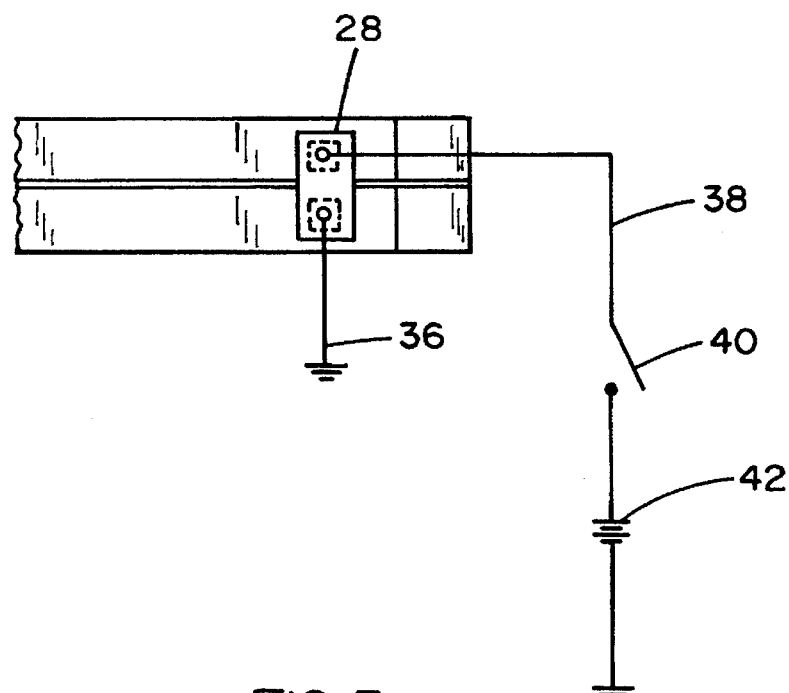
FIG. 3 is a schematic of a typical circuit incorporating the present invention.

As depicted in FIG. 3, a first connection point of the terminal block 28 is connected by lead 36 to vehicle electrical ground, while the second connection point is connected by lead 38 through switch 40 to a terminal of battery 42. The second terminal (typically negative) of the battery is connected to vehicle ground, completing the current path for the heater. Activation of the switch 40, which may include an integral timer (not shown) allows resistive heat to be developed along the length of the coatings 22, which heat is conducted through the windshield glass to melt ice adjacent the windshield edge 20, and correspondingly freeing the wipers which are typically restrained in the at-rest position by icy buildup. The heat is both limited and concentrated along the windshield bottom edge 20, thus providing a localized defrost or deicing action for the windshield wiper blades.

Figure 4:
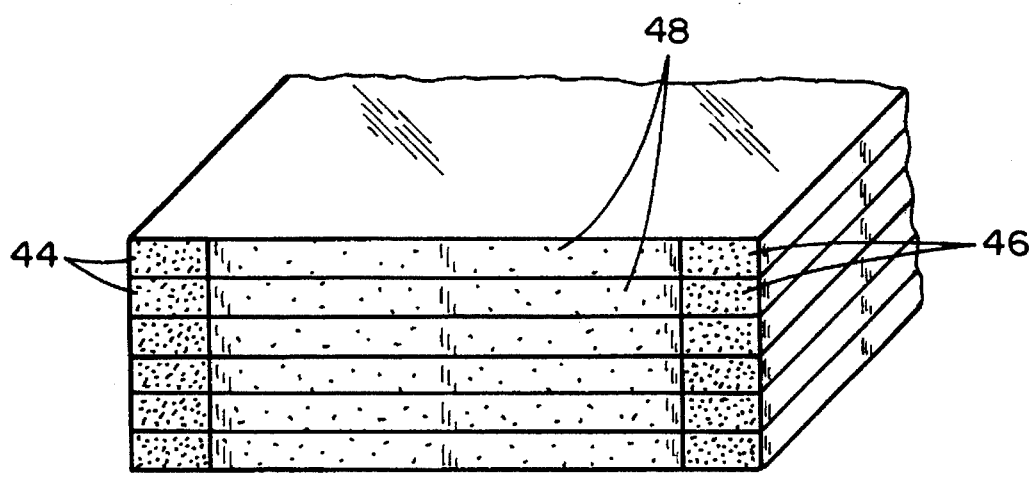
FIG. 4 is a side elevation view of a plurality of glass panels to be incorporated into the present invention during the manufacture thereof.

The windshield construction of the present invention may be formed by a process in which a plurality of work-in-process glass panel elements 44, depicted in FIG. 4, are stacked in a superposed relation with the intermediate plastic plies in place between pairs thereof. Typically, each of the glass panels is of identical shape, intended to be utilized in the manufacture of a plurality of identical windshield units, thus allowing their respective peripheral edges 46 to be fully aligned along their lengths. With the peripheral edges 46 so aligned, a coating layer 48 is applied to the exposed adjacent surfaces of cooperating top and bottom panels respectively, destined as a safety glass windshield along the bottom length portions thereof.

After application and appropriate cure, the pairs of panels 44 are separated, to produce the basic windshield assembly shown in FIGS. 1 and 2. To each removed panel pair the connector and bridge elements are affixed to the coated bottom edges, and the completed windshield installed on a vehicle in a known manner, with the windshield wiper 18 being installed to be pivotally transversable over at least a portion of the windshield, the at-rest position of the wiper being proximate or adjacent the windshield edge 20. The windshield molding as conventionally used to mount the windshield element in the vehicle frame both electrically insulates the coating from the vehicle frame and prevents the entry of water or other contaminating materials.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of practicing the within inventive method other than as defined in the appended claims.

What is claimed is:

1. A method of assembly of an auto front windshield with a windshield wiper mounted near a bottom edge thereof with a conductive coating thereon, said auto front windshield of a type comprised of cooperating exterior and interior glass laminates having adhered therebetween an electrically insulative plastic ply and said windshield wiper of a type pivotally mounted to be traversable over said surface of said exterior glass laminate starting from a position adjacent a bottom edge of said windshield, said method comprising the steps of stacking plural windshields each consisting of glass laminates with an inbetween plastic ply in superposed relation, applying simultaneously to said stacked windshields an electrically conductive coating along bottom edges of said glass laminates thereof, integrating said coated edges into an electrical circuit to be electrically connected to a battery of said auto, and installing on each removed windshield from said stack thereof a windshield wiper pivotally transversable over the exterior driver's side surface thereof starting from a position of movement adjacent said bottom edge, whereby at said starting position of transversing movement said windshield wiper is at rest above a marginal edge of said windshield heated by said battery-operated electric circuit so as to cause a deicing of said windshield wiper.

* * * * *